Nov. 25, 1924.  1,516,830
A. SCHÄFER
ROCK CUTTING
Filed March 14, 1923
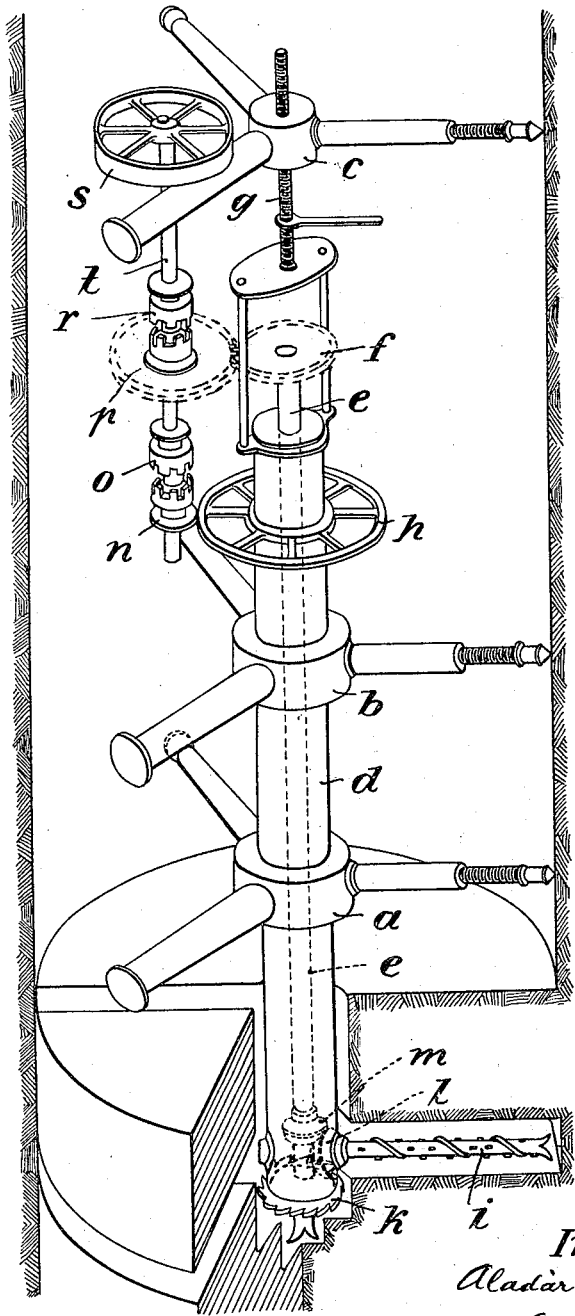

Patented Nov. 25, 1924.

1,516,830

UNITED STATES PATENT OFFICE.

ALADÀR SCHÄFER, OF HANDLOVA, CZECHOSLOVAKIA.

ROCK CUTTING.

Application filed March 14, 1923. Serial No. 624,928.

*To all whom it may concern:*

Be it known that I, ALADÀR SCHÄFER, a citizen of the Czechoslovakian Republic, residing at Handlova, Czechoslovakia, have invented new and useful Improvements in Rock Cutting, of which the following is a specification.

This invention relates to a process for rock cutting and to apparatus for carrying out the said process. The object of the invention is to economize hand labour and to render blasting operations superfluous, any risk of explosion, for instance in coal mining, being thereby avoided.

The process according to the invention substantially consists in cutting, at right angles to the face of the rock, one or more radial slots of a suitable depth, and in then cutting a slot extending parallel to the rock face, whereby a cylindrical radially subdivided block of material is formed, which is connected to the original material only at the periphery and can be easily hewed off in the usual manner.

A construction of the apparatus for carrying out the process according to the invention is illustrated diagrammatically by way of example in the accompanying drawing.

In the drawing, $a$ and $b$ are brackets made in the form of tripods and adapted to support the apparatus in such a manner that a hollow shaft $d$ may be rotated and longitudinally adjusted in the same. Longitudinal movement of the hollow shaft $d$ is effected by means of a spindle $g$ adapted to be operated by a crank or handle and mounted in a tripod bracket $c$. In the hollow shaft $d$ is mounted a spindle $e$ which is provided at the front end with a drilling head $k$ and driven through a clutch $r$ and gear wheels $p$ and $f$ from a counter-shaft $t$. The spindle $e$ drives, by means of bevel wheels $m$ and $l$ mounted in the hollow shaft $d$, one or more cutting tools $i$ radially arranged in one and the same plane. The hollow shaft $d$ is also driven from the counter-shaft $t$ through a clutch $o$ and gear wheels $n$ and $h$.

The working of the apparatus according to the invention is as follows:—

The hollow shaft $d$ is locked in the brackets $a$ and $b$ to prevent it from rotating, so that only a longitudinal movement of the said shaft is possible. The two parts of the coupling $o$ being disengaged and the two parts of the coupling $r$ being brought into engagement, at first only the spindle $e$ with the drilling head $k$ and the cutting tools $i$ are rotated about their own axes. The hollow shaft $d$ is thereupon moved forward by hand by means of the crank handle and spindle $g$, owing to which the cutting tools $i$ are pressed against the cutting face of the rock and consequently radial slots are produced. When the desired depth has been reached, the hollow shaft $d$ is released so that it can rotate, and the clutch $o$ is thrown into engagement so that the said hollow shaft will be rotated and the cutting tools $i$, in addition to rotating about their own axes, will also revolve in a circle and produce a slot parallel to the cutting face of the rock. The block of material thus formed, which is connected to the original rock only at its periphery, is then cut in the usual manner without blasting, by means of a pick or wedges. After the broken rock is removed, the working will be continued in the aforesaid manner.

I claim:—

1. A process for rock cutting, characterized by cutting, at right angles to the face of the rock, one or more radial slots of a suitable depth and then cutting a slot parallel to the rock face whereby a cylindrical radially subdivided block of material is formed, which block is connected to the original rock only at its periphery.

2. Apparatus for carrying out the process set forth in claim 1, comprising a longitudinally adjustable hollow shaft, one or more cutting tools rotatably mounted in said shaft being radially arranged in one and the same plane and supported solely at their inner ends on said hollow shaft, a spindle rotatably mounted in the said shaft and provided at its end with a drilling or boring head, and means for rotating the said cutting tools.

3. An apparatus as claimed in claim 2, characterized by means whereby the said hollow shaft and the said spindle may be operated independently of each other so that slots at right angles to the cutting face of the rock and also slots parallel to the said cutting face may be produced.

4. The apparatus as specified in claim 2, including a plurality of brackets in the form of tripods for supporting the said shaft, a separate bracket in the form of a tripod, and screw-threaded means connected to the said shaft and said separate bracket.

In testimony whereof I have signed my name to this specification in the presence of two subscribing witnesses.

ALADÀR SCHÄFER.

Witnesses:
 A. FRICHER,
 J. MIHYANDER.